US 8,323,365 B2

(12) United States Patent
Drnevich et al.

(10) Patent No.: US 8,323,365 B2
(45) Date of Patent: Dec. 4, 2012

(54) DUAL MODE REACTOR SMR INTEGRATION

(75) Inventors: Raymond Francis Drnevich, Clarence Center, NY (US); Vasilis Papavassiliou, Williamsville, NY (US); Troy Michael Raybold, Colden, NY (US); Ramchandra Mukund Watwe, Houston, TX (US)

(73) Assignee: Praxair Technology, Inc., Danbury, CT (US)

( * ) Notice: Subject to any disclaimer, the term of this patent is extended or adjusted under 35 U.S.C. 154(b) by 923 days.

(21) Appl. No.: 12/125,585

(22) Filed: May 22, 2008

(65) Prior Publication Data
US 2009/0013600 A1 Jan. 15, 2009

Related U.S. Application Data

(60) Provisional application No. 60/931,182, filed on May 22, 2007, provisional application No. 60/964,877, filed on Aug. 15, 2007.

(51) Int. Cl.
*C01B 3/36* (2006.01)
*C01B 6/24* (2006.01)
*C01B 3/02* (2006.01)
*B01J 7/00* (2006.01)
*B01J 8/00* (2006.01)

(52) U.S. Cl. ....... 48/197 R; 48/61; 423/644; 423/648.1; 422/625

(58) Field of Classification Search .................. 48/197 R
See application file for complete search history.

(56) References Cited

U.S. PATENT DOCUMENTS

| 5,110,563 | A | 5/1992 | Noakes et al. | |
|---|---|---|---|---|
| 6,328,945 | B1 * | 12/2001 | Hufton et al. | 423/418.2 |
| 6,335,474 | B1 | 1/2002 | Ostberg et al. | |
| 6,447,745 | B1 | 9/2002 | Feeley et al. | |
| 6,527,980 | B1 * | 3/2003 | Roden et al. | 252/373 |
| 6,981,994 | B2 | 1/2006 | Drnevich et al. | |
| 7,037,485 | B1 | 5/2006 | Drnevich et al. | |
| 2005/0074642 | A1 | 4/2005 | Foger | |
| 2005/0207970 | A1 | 9/2005 | Garg et al. | |
| 2006/0188434 | A1 * | 8/2006 | Mahlendorf et al. | 423/652 |

FOREIGN PATENT DOCUMENTS

WO 2008/064496 A1 5/2008

OTHER PUBLICATIONS

Freni, S. et al., "Hydrogen production from methane through catalytic partial oxidation reactions", Journal of Power Sources, Elsevier, Amsterdam, NL, vol. 87, No. 1-02, Apr. 1, 2000, pp. 28-38.

* cited by examiner

Primary Examiner — Matthew Merkling
(74) Attorney, Agent, or Firm — Iurie A. Schwartz

(57) ABSTRACT

The present invention relates to systems and processes for producing syngas in steam methane reformer (SMR)-based plants, particularly to the use of a high space velocity, dual mode catalytic reactor to pre-reform plant feedstock. The dual mode reactor has the capability to operate in two modes: either without oxygen addition in a reforming mode or with oxygen addition in a partial oxidation-reforming mode. The dual mode reactor allows the syngas production rate of the plant to be manipulated without the added capital expense of a reheat coil and with reduced impact on export steam production.

15 Claims, 6 Drawing Sheets

Standard SMR with Dual Mode Reactor in Preferred Integration

Standard SMR in a Hydrogen Plant

Standard SMR with Conventional Adiabatic Pre-reformer

Standard SMR with Dual Mode Reactor
in Preferred Integration

Standard SMR with Dual Mode Reactor in Alternative Integration

Standard SMR with Dual Mode Reactor in Preferred Integration with Refinery Gas Feedstock Standard SMR with Dual Mode Reactor in Alternative Integration ic # DUAL MODE REACTOR SMR INTEGRATION

CROSS-REFERENCE TO RELATED APPLICATION

The present application claims priority to U.S. provisional patent application Ser. No. 60/931,182, filed May 22, 2007 and claims priority to U.S. provisional patent application Ser. No. 60/964,877, filed Aug. 15, 2007; the entire contents of both U.S. provisional patent application Ser. No. 60/931,182 and U.S. provisional patent application Ser. No. 60/964,877 are incorporated herein by reference in their entirety.

TECHNICAL FIELD

The present invention relates to systems and processes for producing syngas in steam methane reformer (SMR)-based plants, and more particularly to methods and systems that include high space velocity, dual mode catalytic reactors used to pre-reform feedstock and manipulate the syngas production rates of such SMR-based plants.

BACKGROUND ART

Steam methane reformers (SMRs) are commonly used to produce a syngas including hydrogen and carbon monoxide from a gas feedstock such as natural gas or refinery gas. The produced syngas can be further processed within the plant to yield various end products, including purified hydrogen, carbon monoxide, methanol and/or ammonia. Conventional adiabatic pre-reformers can be incorporated into SMR-based syngas plants for different reasons. For example, pre-reformers may be implemented in order to: (i) reduce the content of ethane and heavier hydrocarbons in the feedstock to the SMR, thereby reducing the propensity for carbon formation on the SMR catalyst and potentially enabling higher SMR feed temperatures or lower SMR feed steam-to-carbon molar ratios, and/or (ii) increase the production rate of syngas or syngas-derived products from the plant for a fixed SMR furnace duty.

Conventional adiabatic pre-reformers are catalytic reactors typically charged with pellet or shaped supported catalyst loaded with a high Ni content. Typical pre-reformer gas hourly space velocities (GHSVs) based on total feed at standard conditions (i.e. 60° F. and 1 atm) can range from 15,000/hr to 25,000/hr. Typical pre-reformer feeds are steam and hydrocarbon mixtures with a steam-to-carbon molar ratio of 2 to 3, preheated to between 900° and 1200° F. Temperature change across the pre-reformer is dictated by the hydrocarbons in the feed. When significant methane steam reforming occurs, temperatures decrease along the reactor due to the endothermic reaction.

In order to increase the production rate of the plant for a constant SMR furnace duty, the pre-reformer effluent must be reheated against SMR flue gas, typically to 1100°-1200° F. Installation of this reheat coil can be expensive, especially for existing plants, as the SMR flue gas duct must be opened and modified. Removing heat from the SMR flue gas through the reheat coil also reduces the amount of export steam that can be produced in the downstream flue gas boiler and sold to customers.

U.S. Pat. No. 7,037,485 B1 to Drnevich et al. relates to the use of a dual mode reactor for converting olefin containing gas for use as a feed for a steam methane reformer. The first mode is a hydrogenation mode while the second mode is a partial oxidation mode. Some pre-reforming is accomplished in the second partial oxidation mode, but the capability to substantially manipulate the syngas production rate of the plant is limited, since the steam-to-carbon molar ratios in the reactor feed are to be maintained below 0.5, due to the presence of downstream sulfur removal beds.

U.S. Pat. No. 6,335,474 B1 to Ostberg et al. relates to the use of a noble metal catalyst on a MgO and/or $MgAl_2O_4$ spinel carrier to pre-reform hydrocarbon feedstocks containing oxygen impurities.

U.S. Patent Application No. 2005/0207970 A1 to Garg et al. considers the pre-reforming of natural gas over a nickel catalyst using oxygen in an amount less than that stoichiometrically required to partially oxidize all ethane and heavier hydrocarbons in the natural gas to carbon monoxide and hydrogen. For most natural gases, this translates into oxygen-to-natural gas molar ratios of less than 0.1, an amount that would not substantially increase the production rate of the SMR-based syngas plant.

SUMMARY OF THE INVENTION

The present invention relates to systems and processes for producing syngas in steam methane reformer (SMR)-based plants, and more particularly to the use of a high space velocity, dual mode catalytic reactor to pre-reform plant feedstock. The dual mode reactor has the capability to operate in two modes: either without oxygen addition in a reforming mode or with oxygen addition in a partial oxidation-reforming mode. It is expected that the dual mode reactor will allow the syngas production rate of the plant to be manipulated without the added capital expense of a reheat coil and with reduced impact on export steam production.

As used herein, space velocity refers to gas hourly space velocity (GHSV), which is the ratio of the volumetric flow of the total reactor feed at standard conditions of 60° F. and 1 atm to the catalyst volume. As used herein, high space velocity(ies) refers to GHSV(s) of greater than 30,000/hr.

BRIEF DESCRIPTION OF THE DRAWINGS

For a more complete understanding of the present invention and the advantages thereof, reference should be made to the following Detailed Description taken in conjunction with the accompanying drawings in which.

DETAILED DESCRIPTION

As discussed hereinabove, the present invention relates to systems and processes for producing syngas in steam methane reformer (SMR)-based plants, and more particularly to the use of a high space velocity, dual mode catalytic reactor to pre-reform plant feedstock. The dual mode reactor has the capability to operate in two modes: either without oxygen addition in a reforming mode or with oxygen addition in a partial oxidation-reforming mode. The dual mode reactor is expected to allow the syngas production rate of the plant to be manipulated without the added capital expense of a reheat coil and with reduced impact on export steam production. As used herein, space velocity refers to gas hourly space velocity (GHSV), which is the ratio of the volumetric flow of the total reactor feed at standard conditions of 60° F. and 1 atm to the catalyst volume. As used herein, high space velocity(ies) refers to GHSV(s) of greater than 30,000/hr.

Standard SMR

Figure 1:
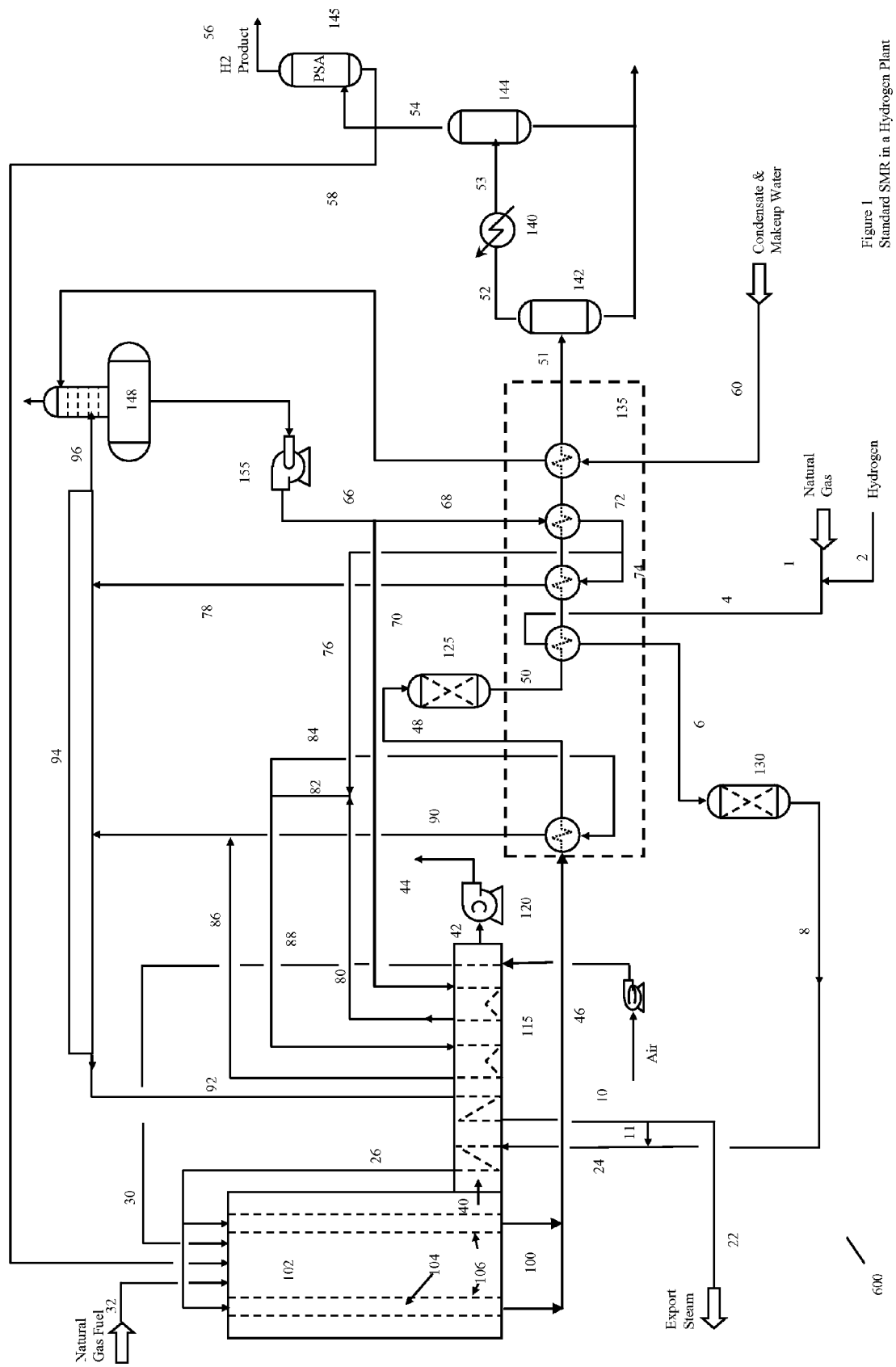
FIG. 1 is a schematic illustrating conventional steam methane reformer (SMR) technology employed in a hydrogen plant.

Referring now to FIG. 1, a schematic diagram of conventional steam methane reformer technology used as the basic process for producing intermediate to large quantities of hydrogen in hydrogen plant 600 for use in refineries and other applications is illustrated.

More specifically, natural gas 1 is mixed with a small amount of hydrogen product 2 to form stream 4 that is preheated in product heat recovery system 135. The heated stream 6 is hydrotreated and sulfur is removed in combined hydrotreater adsorber 130. The desulfurized feed stream 8 is mixed with superheated steam 11 to form stream 24. Steam 11 is produced by superheating saturated steam 92 against flue gas 40 in heat recovery unit 115, which is also known as the reformer's convection section. The steam to carbon ratio in stream 24 can vary depending on the design but normally is in the range of about 3/1. As also shown in FIG. 1, the natural gas-steam mixture 24 is further heated against flue gas 40, generating stream 26. Stream 26, typically at 900 to 1200° F., is introduced into the reformer tubes 106 contained in steam methane reformer 100. The internal volume of the reformer tubes 104 are filled with catalyst, usually composed of nickel compounds. The catalyst promotes the conversion of the natural gas-steam mixture to hydrogen and carbon monoxide. Gas temperatures in the tube-side reformer typically range from about 900° F. to about 1700° F. Tube-side gas temperatures increase from the reformer inlet to the exit. The maximum tube-side gas temperature, normally about 1600° F., is at the reformer exit. Both the steam methane reforming reaction:

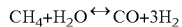

and the shift conversion reaction:

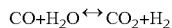

take place within tube volume 104. The reformed gas exits reformer 100 as stream 46, mainly including a mixture of hydrogen, carbon monoxide, carbon dioxide, water vapor and unreacted methane. Typical hydrogen contents of stream 46 may range from 46 to 50 mol %.

Stream 46 is cooled in process-gas heat-recovery system 135 against hot water producing steam. After steam is generated, the still hot syngas leaves unit 135 as stream 48 and enters the shift conversion unit 125 where the shift reaction is driven further to the right. The shift conversion reaction is slightly exothermic and the unit(s) normally operates at temperatures ranging from about 400° F. to about 900° F. In this case stream 50, leaving the shift conversion reactor at about 800° F., is reintroduced to unit 135 where it is cooled against the feed gas 4 and various streams containing water. Gas 51 exits process heat recovery section 135 and enters knockout drum 142, in which condensed water vapor is separated from the process stream. Gas 52 is further cooled in unit 140 against cooling water and/or through the use of fin-fan type air coolers. Cooled gas 53 enters knockout drum 144, in which additional condensed water vapor is separated from the process stream. Cooled and dried stream 54 is introduced into pressure swing adsorption (PSA) unit 145. The PSA produces hydrogen 56 at purities ranging from about 99% to about 99.999% based on the system design. The PSA hydrogen recovery can range from about 75% to about 95%. The unrecovered hydrogen and any carbon monoxide, methane, water vapor, carbon dioxide and nitrogen present in stream 54 are purged from the PSA unit as tail gas 58. The tail gas is normally sent back to the reformer to be used as fuel.

Additional natural gas 32 and, for hydrogen plants with PSA purification, PSA tail gas 58 are burned with preheated air 30 in burners (not shown) to provide the heat to drive the reforming reactions. The burner exhausts into the "radiant" section of the reformer 102 where the heat generated through combustion is transferred by radiant and convective mechanisms to the surface of tubes 106. Heat from the tube surface is conducted to the interior of the tubes and transferred to the process gas through convection. The tube wall temperature is a critical parameter influencing the life of the tubes. Excess temperatures can dramatically reduce the time between tube replacements. The flue gas 40, leaving the radiant section at temperatures ranging from about 1600° F. to about 2000° F., enters the convection section 115 where the contained sensible heat is used to preheat the natural gas-steam mixture as well as produce and superheat steam. The flue gas 42 leaving the convection section 115 enters an induced draft fan 120 which is used to maintain the radiant section of the reformer at a pressure slightly below atmospheric. Stream 44 is sent to a flue stack where it is vented to the atmosphere, normally at temperatures in excess of about 260° F.

Stream 60, a mixture of condensate and makeup boiler feedwater, is heated in unit 135, then de-aerated in unit 148. Steam 96 is commonly used as a purge gas in the de-aerator. The de-aerated boiler feed water is pumped in unit 155 to the pressure needed to provide superheated steam at sufficient pressure for mixing with natural gas to produce stream 24 and/or high enough to provide superheated steam for export. Stream 66 is split into stream 68 and 70. Stream 68 is sent to unit 135 where it is heated to near the boiling temperature. Stream 72 is then split into stream 74 and 76. Stream 74 is boiled in unit 135. Stream 70 goes to unit 115 where it is heated to near the boiling temperature. Stream 80 is mixed with stream 76 to form stream 82 and then is split into streams 84 and 88 that go to units 135 and 115, respectively, to be vaporized. Saturated steam 86 and 90 from unit 115 and unit 135, respectively are mixed with stream 78 in saturated steam header 94. Most of the steam is sent as stream 92 to be superheated in unit 115. A small quantity 96 is sent to the deaerator 148. The superheated steam leaves unit 115 as stream 10 and is split into stream 11 for mixing with the natural gas feed to the reformer and into stream 22 which can be sold, used to produce electricity, or used to provide heat to unit operations associated with a refinery or chemical plant operations.

Standard SMR with Conventional Adiabatic Pre-Reformer

Figure 2:
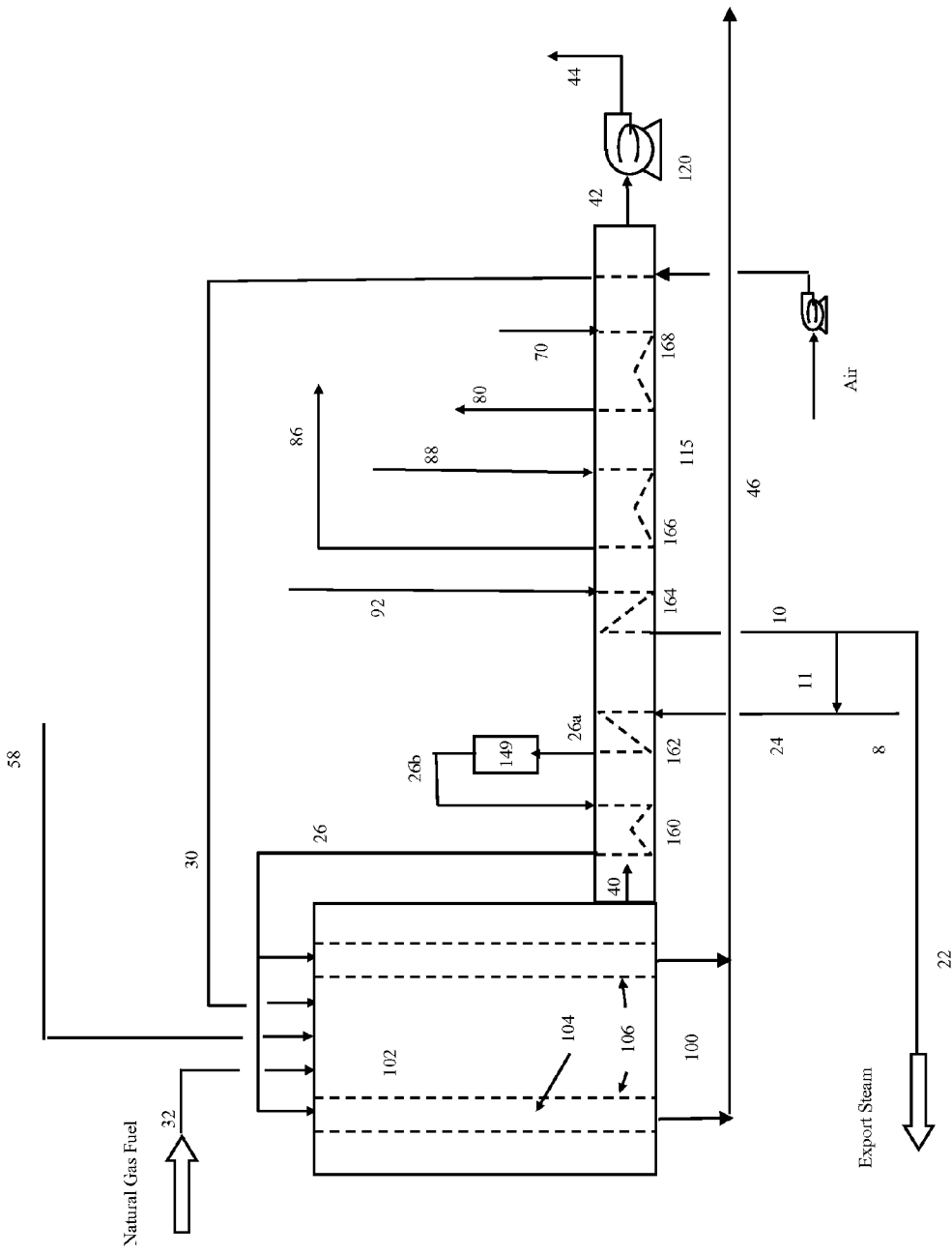
FIG. 2 is a schematic illustrating a standard SMR with a conventional adiabatic pre-reformer (with some plant equipment shown in FIG. 1 having been excluded for clarity)

FIG. 2 is a schematic of a basic SMR that includes a conventional adiabatic pre-reformer. Conventional adiabatic pre-reformer 149 is a catalytic reactor typically charged with pellet or shaped supported catalyst loaded with a high Ni content. The reactor is sized such that the gas hourly space velocity (GHSV) based on total feed at standard conditions (i.e. 60° F. and 1 atm) is 15,000/hr to 25,000/hr. Conventional adiabatic pre-reformer 149 can be incorporated into steam methane reformer (SMR)-based syngas plants for different reasons. For example, a pre-reformer may be implemented in order to: (i) reduce the content of ethane and heavier hydrocarbons in the feedstock to the SMR, thereby reducing the propensity for carbon formation on the SMR catalyst and potentially enabling higher SMR feed temperatures or lower SMR feed steam-to-carbon molar ratios, and/or (ii) increase the production rate of syngas or syngas-derived products from the plant for a fixed reformer furnace duty.

Stream 24, which includes heated, desulfurized natural gas 8 and superheated steam 11, is further heated against SMR flue gas in the mixed feed preheat coil 162 to between about 900° and 1200° F. Resulting stream 26$a$ is fed to conventional adiabatic pre-reformer 149, where hydrocarbon steam reforming and water gas shift reactions occur, producing hydrogen, carbon monoxide and carbon dioxide. Due to these net endothermic reactions, pre-reformer effluent 26$b$ emerges at a lower temperature than stream 26$a$ with little or no remaining ethane and heavier hydrocarbons. The extent of these reactions is primarily dictated by the temperature of feed 26$a$.

If pre-reformer effluent 26$b$ were directly fed to SMR 100 operating at a constant fired duty, the reduced stream temperature of stream 26$b$ would prevent any increase in the plant 600 hydrogen production rate. In order to achieve an increase in the production rate of the plant 600, pre-reformer effluent 26$b$ must therefore be reheated against SMR flue gas 40 in reheat coil 160, typically to temperatures between about 1100° to 1200° F. The reheated temperature of stream 26 may be dictated by piping metallurgy and/or by carbon formation concerns. Installation of reheat coil 160 can be expensive, especially for existing plants, as the SMR flue gas duct 115 must be opened and modified. Removing heat from the SMR flue gas through reheat coil 160 also reduces the amount of export steam 22 that can be produced and sold to customers, because less heat is available to the downstream boiler feed water heater 168, flue gas boiler 166 and steam superheater 164.

Dual Mode Reactor

Figure 3:
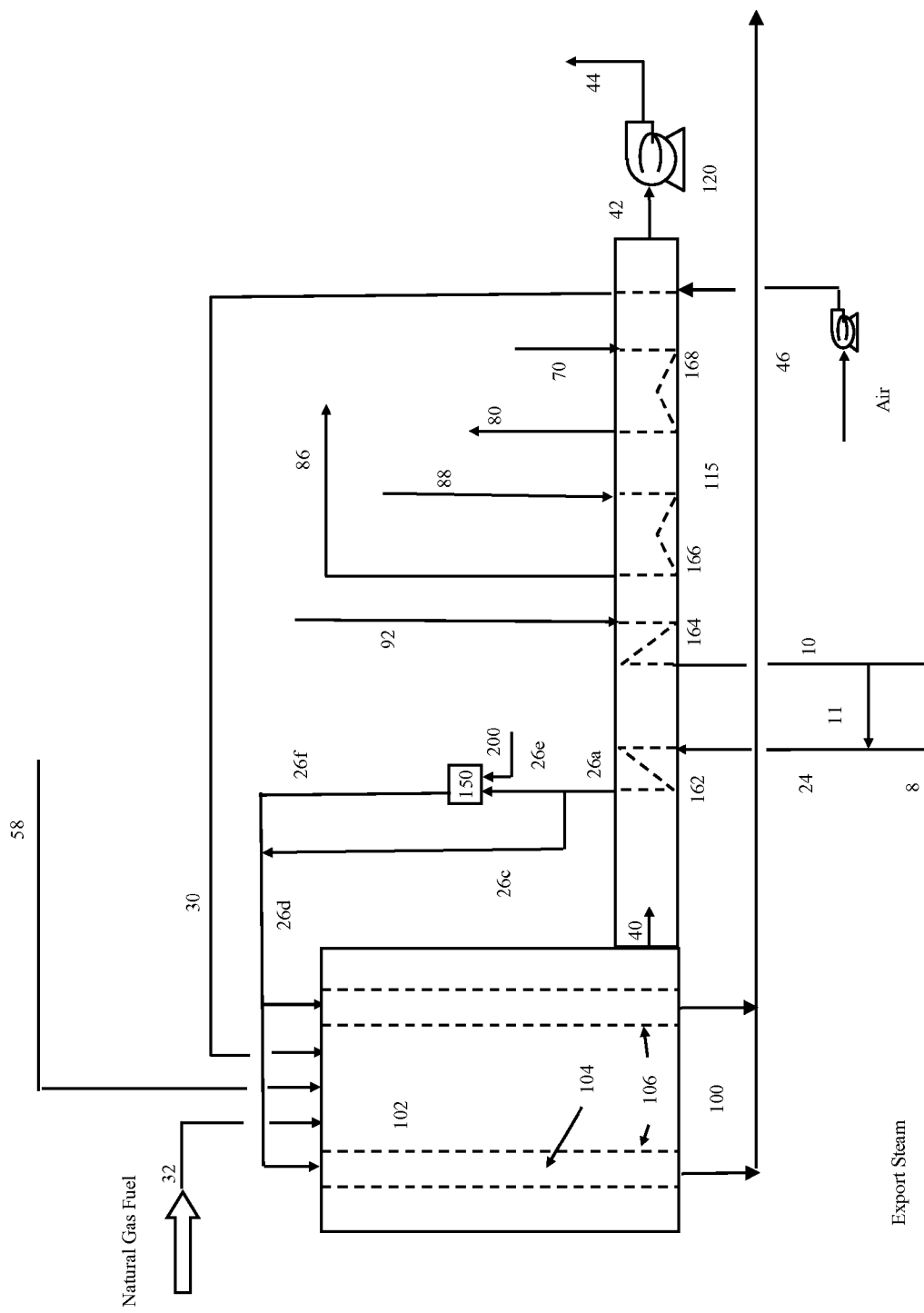
FIG. 3 is a schematic illustrating the dual mode reactor of the present invention integrated with the standard SMR in accordance with a preferred embodiment of the present invention (with some plant equipment shown in FIG. 1 having been excluded for clarity)

Referring now to FIG. 3, a preferred embodiment of the dual mode reactor integrated with the standard SMR in accordance with the present invention is shown. The dual mode reactor 150, which replaces the conventional adiabatic pre-reformer, is a high space velocity catalytic reactor that has the capability to operate in two modes: either without oxygen addition in a reforming mode or with oxygen addition in a partial oxidation-reforming mode. As discussed above, space velocity refers to gas hourly space velocity (GHSV), which is the ratio of the volumetric flow of the total reactor feed at standard conditions of 60° F. and 1 atm to the catalyst volume. High space velocity(ies) refers to GHSV(s) of greater than 30,000/hr. To-date, experimental data have confirmed that space velocities of about 46,000/hr can be desirable for reactor 150 performance. However, catalysts used in reactor 150 at even higher space velocities could be advantageous.

In any embodiment of the present invention, dual mode catalytic reactor 150 preferably contains a Group VIII catalyst supported on a metallic monolith. That is, dual mode catalytic reactor 150 contains a catalyst which is preferably a metallic monolith coated with a catalytic layer that contains platinum, rhodium, palladium, nickel, ruthenium, or a combination of these metals. The structure of the monolith can be reticulated foam, honeycomb or a corrugated foil wound in a spiral configuration. It is believed that the metallic monolith supported catalyst has better performance than other supported catalyst in that it has better heat conductivity and a more uniform temperature profile than other catalyst forms. However, catalyst coated beads or ceramic monoliths in the form of a reticulated foam or honeycomb structure are other options. One viable catalyst in the form of a monolith is commercially available from Sud-Chemie, Inc. of Louisville, Ky., USA as PC-POX 1 on FeCrAlY. Similar catalysts from other suppliers may be used.

In partial oxidation-reforming mode, the effluent 26$a$ from the mixed feed preheater 162 typically at 900 to 1200° F. is split into streams 26$c$ and 26$e$. Stream 26$e$, which is preferably 10 to 75% and more preferably 20 to 50% of stream 26$a$, is fed to dual mode catalytic reactor 150. Oxygen-containing stream 200, preferably greater than 99.0% pure oxygen, is also introduced into reactor 150, where it reacts with stream 26$e$ in a combination of partial oxidation, complete oxidation, hydrocarbon steam reforming and water gas shift reactions. It is preferred that sufficient oxygen is added such that the net reaction is exothermic and stream 26$f$ emerges at a higher temperature than stream 26$e$, typically ranging from 1100 to 1800° F. Reactor effluent 26$f$ is quenched with the lower temperature bypassed stream 26$c$ to form stream 26$d$, which is fed to SMR 100. Though not shown, reactor effluent 26$f$ could be additionally quenched by adding a portion of boiler feed water (e.g. stream 80), steam (e.g. stream 86), superheated steam (i.e. 11), preheated hydrocarbon feedstock (i.e. 8) and/or mixed feed (i.e. stream 24). By using these additional quench streams, the steam-to-carbon molar ratio of the feed to reactor 150 (i.e. stream 26$e$) can be maintained at a different value than that of the feed to SMR 100 (i.e. stream 26$d$).

Unlike conventional adiabatic pre-reformer 149 of FIG. 2, the extent of hydrocarbon reforming within dual mode catalytic reactor 150 is not primarily dictated by the temperature of feed 26$a$. Instead, the amount of hydrocarbon reforming can be adjusted by manipulating the flow of oxygen-containing stream 200. More oxygen results in higher reactor exit temperatures and more hydrocarbon reforming. Both the selected oxygen flow and the amount of mixed feed 26$a$ sent to the reactor 150 as stream 26$e$ dictate the total achievable increase in the plant 600 hydrogen production rate. Bypass stream 26$c$, oxygen-containing stream 200, and any other reactor 150 effluent quench streams may be manipulated to obtain the desired hydrogen production rate while maintaining stream 26$d$ below some maximum allowable temperature dictated by piping metallurgy and/or by carbon formation concerns.

Even though some of the mixed feed 26$a$ is bypassed around the dual mode catalytic reactor 150 as stream 26$c$, more total hydrocarbon reforming can be achieved relative to the conventional adiabatic pre-reformer of FIG. 2, since the reactor 150 of FIG. 3 generally operates at higher exit temperatures due to the addition of oxygen. Since reactor 150 need only be sized to process a portion of stream 26$a$ and since the design space velocity for reactor 150 will be higher than the conventional pre-reformer, a relatively smaller reactor vessel and less catalyst is required to achieve larger hydrogen production rates. Smaller reactor sizes may also allow for the use of parallel trains of reactor 150, which could increase reliability and decrease downtime for catalyst change-outs.

Unlike the conventional adiabatic pre-reformer of FIG. 2, the dual mode catalytic reactor 150 does not require a reheat coil in order to increase hydrogen production rates. Instead, heat is generated in-situ by exothermic reactions involving oxygen. Besides further reducing capital costs, elimination of the reheat coil can also mitigate the reduction of export steam.

If additional hydrogen production is not required, injection of oxygen-containing stream 200 can be terminated and the dual mode catalytic reactor 150 can be operated in reforming mode. Oxygen flow is terminated by closing the appropriate valves. Reactor bypass flow 26c could be maintained at the partial oxidation-reforming mode setpoint or could optionally be reduced to zero by closing the appropriate valves. Reforming mode may be entered when the value of additional hydrogen is insufficient to justify the additional cost of oxygen. Though no additional hydrogen production from plant 600 will be achieved in reforming mode, hydrocarbon steam reforming and water gas shift reactions will still occur and the ethane and heavier hydrocarbon content of stream 26d fed to SMR 100 will still be reduced. As used herein, heavier hydrocarbons refers to all hydrocarbons containing two or more carbon atoms.

Table 1 presents the simulated performance of hydrogen plant 600 for five cases: (a) the base case described in FIG. 1, (b) the base case retrofitted with a conventional adiabatic prereformer from FIG. 2, (c) the base case retrofitted with a dual mode reactor operating in reforming mode from FIG. 3, (d) the base case retrofitted with a dual mode reactor operating in partial oxidation-reforming mode from FIG. 3, and (e) case (d) with increased oxygen usage. Thus, cases (c) to (e) represent the same dual mode reactor system operating with varying levels of oxygen addition. All cases presume a desulfurized natural gas feedstock, a constant SMR 100 fired duty of about 697.7 MMBTU/hr LHV and a constant mixed feed 24 steam-to-carbon ratio of 2.8. As used herein, "MMBTU/hr LHV" refers to the contained energy flow rate of the stream in millions of BTUs per hour on a lower heating value basis.

In simulated cases (d) and (e), both reactor bypass 26c and a portion of mixed feed 24 are used to quench reactor 150 effluent 26f, maintaining stream 26d at a maximum temperature of 1150° F. The simulations indicate that case (d) uses 144 tons per day (tpd) of 99.9% pure oxygen in stream 200 to achieve a reactor 150 exit temperature of 1400° F. and a plant 600 hydrogen production rate of 110.4 MMSCFD, while case (e) uses 222 tpd of 99.9% pure oxygen in stream 200 to achieve a reactor exit temperature of 1600° F. and a plant 600 hydrogen production rate of 115.4 MMSCFD. In the absence of the reheat coil, case (c) produces the same amount of hydrogen as the case (a) basis, namely 100 MMSCFD. Cases (c) through (e) demonstrate that the stream 200 oxygen and the reactor bypass 26c can be manipulated in real time during plant 600 operation to achieve variable hydrogen production rates from 100 to 115.4 MMSCFD while using the same dual mode reactor 150. Stream 26d SMR feed can simultaneously be maintained at or below a maximum temperature.

Due to the bypassed flow and a larger GHSV, the dual mode reactor of cases (c) to (e) requires almost 90% less catalyst (i.e. 36 vs. 347 ft3) than the conventional adiabatic pre-reformer of case (b). The case (d) and (e) simulations demonstrate that this smaller reactor 150 can still achieve 0.4 and 5.4 MMSCFD more hydrogen production from plant 600, respectively, than the much larger conventional adiabatic prereformer 149. Additionally, the retrofit installation of reheat coil 160 is not required. Both the smaller reactor vessel and the elimination of a reheat coil retrofit should reduce capital costs.

Finally, for the case (b) adiabatic pre-reformer, the increase in plant 600 hydrogen production rate comes at the expense of an estimated 24% reduction in export steam sales (i.e. 156 to 119 thousand pounds per hour or kpph). However, for the simulated dual mode reactor cases (d) and (e), even more hydrogen is produced with a net 4 to 9% increase in export steam sales.

TABLE 1

Simulated comparison of present invention vs. conventional alternative

| | Case ID | | | | |
|---|---|---|---|---|---|
| Case Descriptors | A Base | B Conventional Pre-reformer | C Dual Mode-Reforming | D Dual Mode-POX/Reforming-Less O2 | E Dual Mode-POX/Reforming-More O2 |
| Reactor 149 or 150 Total Feed Flow, kscfh | | 6940 | 1803 | 1803 | 1803 |
| Reactor 149 or 150 GHSV, 1/hr | | 20000 | 50000 | 50000 | 50000 |
| Reactor 149 or 150 Catalyst Volume, ft 3 | | 347 | 36 | 36 | 36 |
| Reactor 149 or 150 Exit T, F | | 898 | 928 | 1400 | 1600 |
| SMR Feed T, F | 1120 | 1200 | 928 | 1150 | 1150 |
| Steam/Carbon to Reactor 149 or 150 | | 2.8 | 2.8 | 2.8 | 2.8 |
| Product H2, mmscfd | 100.0 | 110.0 | 100.0 | 110.4 | 115.4 |
| SMR Fired Duty, mmbtu/hr LHV | 697.7 | 697.6 | 697.8 | 697.7 | 697.6 |
| NG Feed, kscfh | 1620 | 1787 | 1619 | 1821 | 1919 |
| NG Fuel, kscfh | 124 | 55 | 125 | 95 | 84 |
| Export Steam, kpph | 156 | 119 | 156 | 163 | 170 |
| O2, tpd | 0 | 0 | 0 | 144 | 222 |

For case (b), the conventional adiabatic pre-reformer 149 is presumed to achieve equilibrium at the simulated reactor exit temperature of 898° F. The pre-reformed feedstock 26b is routed to the reheat coil 160, where it emerges as stream 26 at 1200° F. The resulting simulated plant 600 hydrogen production rate is 110 MMSCFD, a 10% increase over base case (a). As used herein, "MMSCFD" refers to the standard volumetric flow rate of the stream in millions of standard cubic feet per day at 1 atm and 60° F.

While a reheat coil analogous to coil 160 in FIG. 2 could conceivably be used in conjunction with the FIG. 3 embodiment, it is not preferred given the additional expense and given its severe underutilization while operating in the partial oxidation-reforming mode. While such a reheat coil would provide increased plant 600 output during operation in reforming mode, provisions would need to be made to avoid overheating the coil in partial oxidation-reforming mode. If a pre-existing reheat coil were present at the syngas-producing plant, it could be integrated into the present invention.

Figure 4:
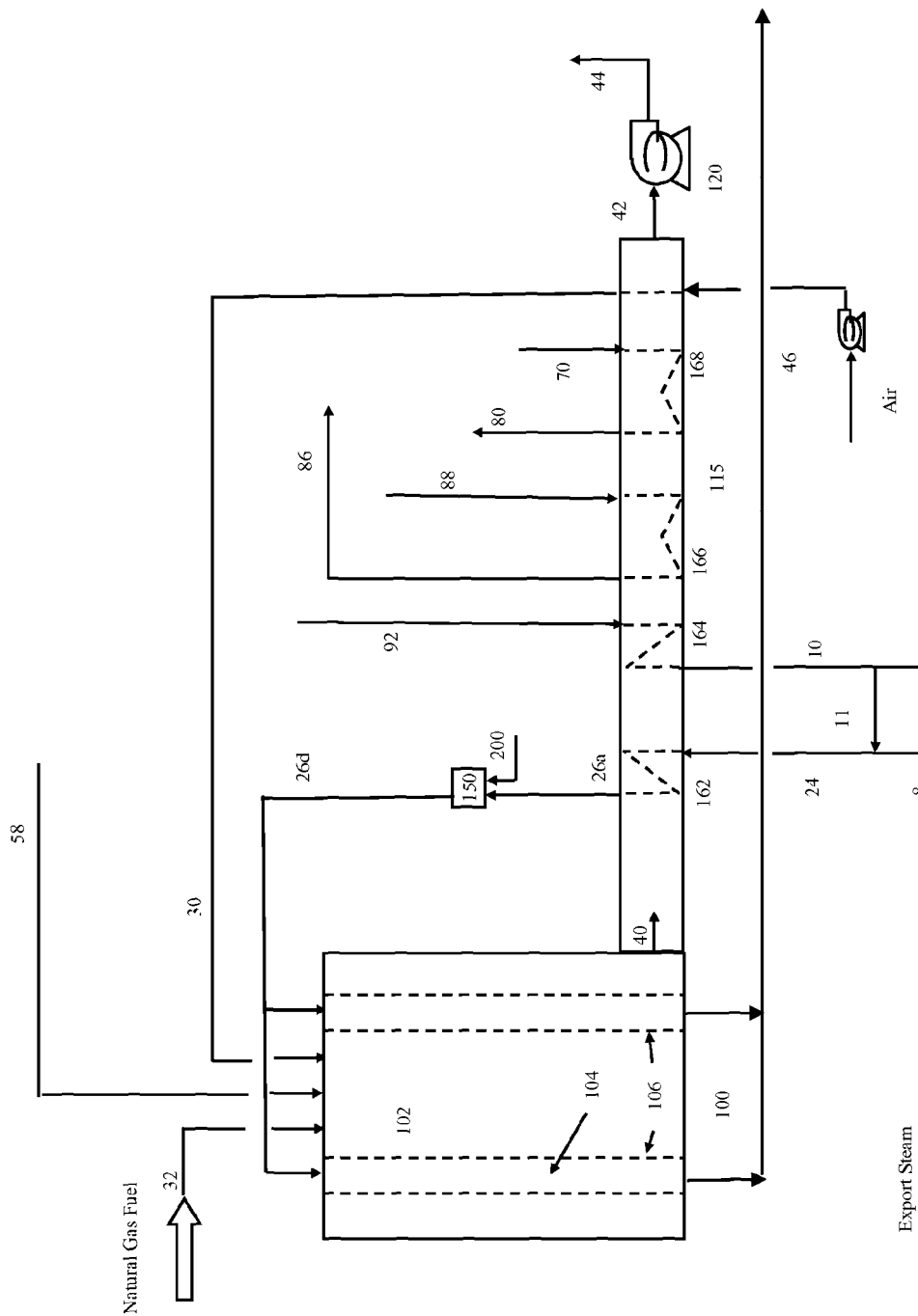
FIG. 4 is a schematic illustrating the dual mode reactor of the present invention integrated with the standard SMR in an alternative embodiment of the present invention (with some plant equipment shown in FIG. 1 having been excluded for clarity)

FIG. 4 shows an alternative embodiment of the present invention in which the dual mode reactor is integrated with the standard SMR such that there is no bypass around reactor 150. Reactor 150 of FIG. 4 would be operated at lower temperatures (e.g. 1000°-1300° F.) than reactor 150 of FIG. 3 for two reasons. First, all feedstock undergoes reaction in the embodiment shown in FIG. 4, and so a lower reactor 150 exit temperature is required for a targeted amount of total hydrocarbon reforming. Second, in the embodiment shown in FIG. 4, reactor 150 exit temperatures will be at least partly dictated by piping metallurgy and/or by carbon formation concerns, since there is no quenching from a reactor bypass stream. On the one hand, some disadvantages of the embodiment shown in FIG. 4 relative to the embodiment shown in FIG. 3 could include: (i) significantly larger reactor 150 feed flows resulting in the need for larger vessel sizes and larger catalyst requirements and/or (ii) less flexibility due to fewer process variables that can be manipulated. On the other hand, however, some advantages of the FIG. 4 embodiment relative to the embodiment illustrated in FIG. 3 could include: (i) more complete elimination of ethane and heavier hydrocarbons since no mixed feed is bypassed around reactor 150, (ii) lower catalyst temperatures, which could lengthen catalyst life, and/or (iii) elimination of any high temperature valving required for the reactor bypass.

Figure 5:
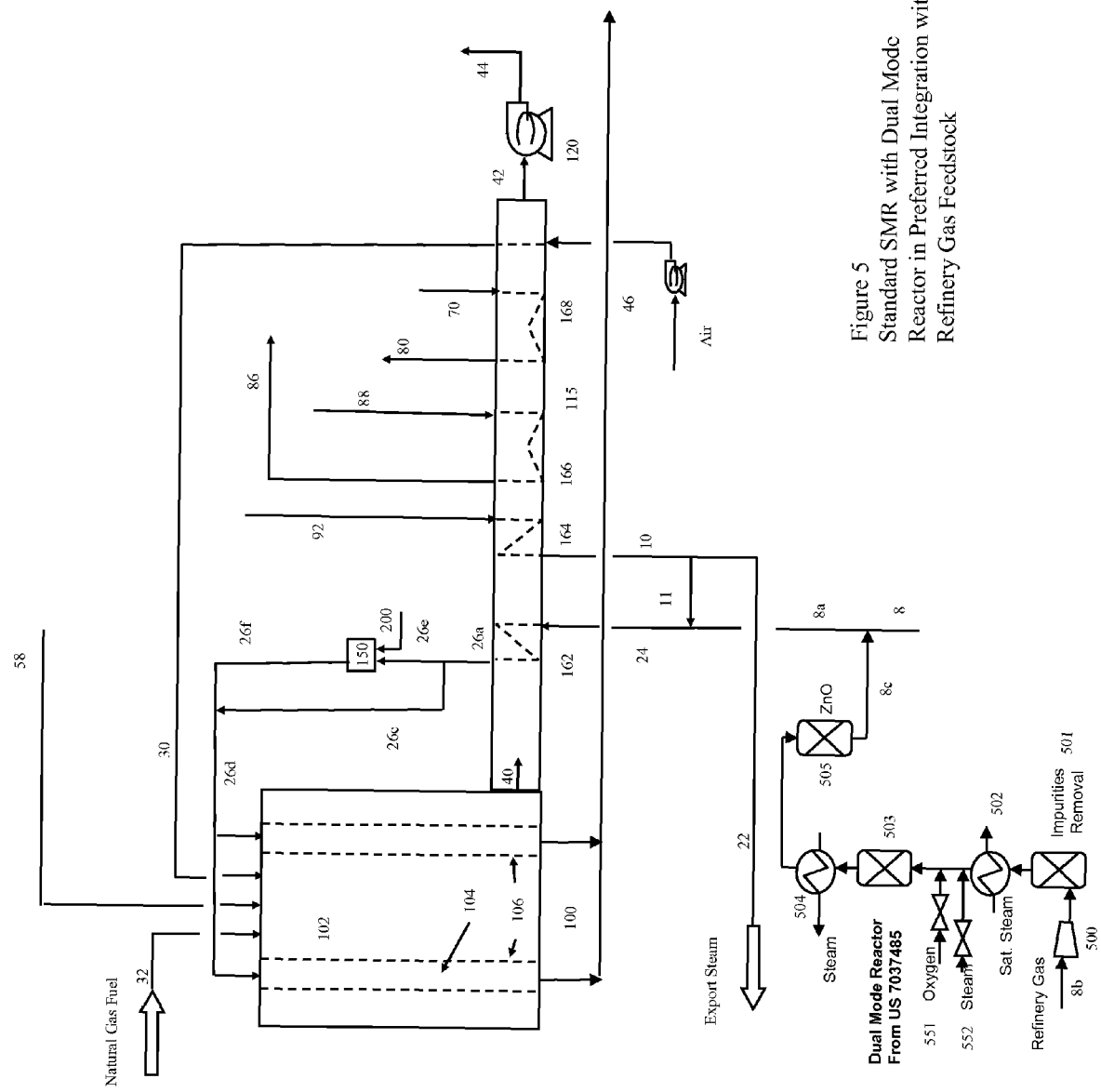
FIG. 5 is a schematic illustrating a dual mode reactor of the present invention integrated with the standard SMR in yet another alternative embodiment of the present invention which includes processing a feedstock partly comprised of refinery gas (with some plant equipment shown in FIG. 1 having been excluded for clarity)

FIG. 5 shows the preferred embodiment of FIG. 3 in combination with an embodiment of U.S. Pat. No. 7,037,485 B1. The entire contents of U.S. Pat. No. 7,037,485 B1 are incorporated herein by reference. More specifically and as shown in FIG. 5, raw refinery gas containing olefins 8b is processed as taught by U.S. Pat. No. 7,037,485 B1, resulting in a desulfurized and heated refinery gas feedstock with reduced olefin content 8c. Stream 8c is combined with desulfurized and heated natural gas 8, resulting in stream 8a, which is ultimately fed to dual mode reactor 150.

Raw refinery gas 8b is compressed in one or more intercooled compressor stages 500 and passed through an impurities removal bed 501 which may remove sulfur species, metals, halides and other impurities of concern. The refinery gas is then heated against condensing steam in preheater 502.

When dual mode reactor 503 from U.S. Pat. No. 7,037,485 is operating in hydrogenation mode, steam 552 may optionally be added to suppress carbon formation. In this mode, olefin hydrogenation reactions dominate reactor 503, and the reactor effluent has a reduced olefin content.

When dual mode reactor 503 from U.S. Pat. No. 7,037,485 is operating in oxidation mode, steam 552 and oxygen-containing gas 551 are added. In this mode, partial oxidation, complete oxidation, hydrocarbon steam reforming and water gas shift reactions occur within reactor 503, and the reactor effluent has both a reduced olefin content and an increased content of carbon monoxide plus carbon dioxide plus methane. In either mode, the effluent from reactor 503 emerges at a higher temperature than the inlet due to net exothermic reactions. Thus, the effluent is cooled in a boiler 504 and passed through a zinc oxide bed 505 to reduce sulfur to levels acceptable to the SMR 100 catalyst (e.g. <0.1 ppmv on a dry basis).

FIG. 5 illustrates that the hydrocarbon feed to the dual mode reactor 150 need not be natural gas, but can be any hydrocarbon, including refinery gas or mixtures of refinery gas and natural gas. Other approaches for managing and processing refinery gases than that described in U.S. Pat. No. 7,037,485 may be used. It should be noted, however, that all hydrocarbons in the feedstock to the high space velocity, dual mode reactor in accordance with the embodiments of the present invention must be desulfurized to an acceptable level for the SMR 100 catalyst, preferably less than 1 ppmv and more preferably less than 0.1 ppmv on a dry basis, prior to being introduced into dual mode reactor 150.

Figure 6:
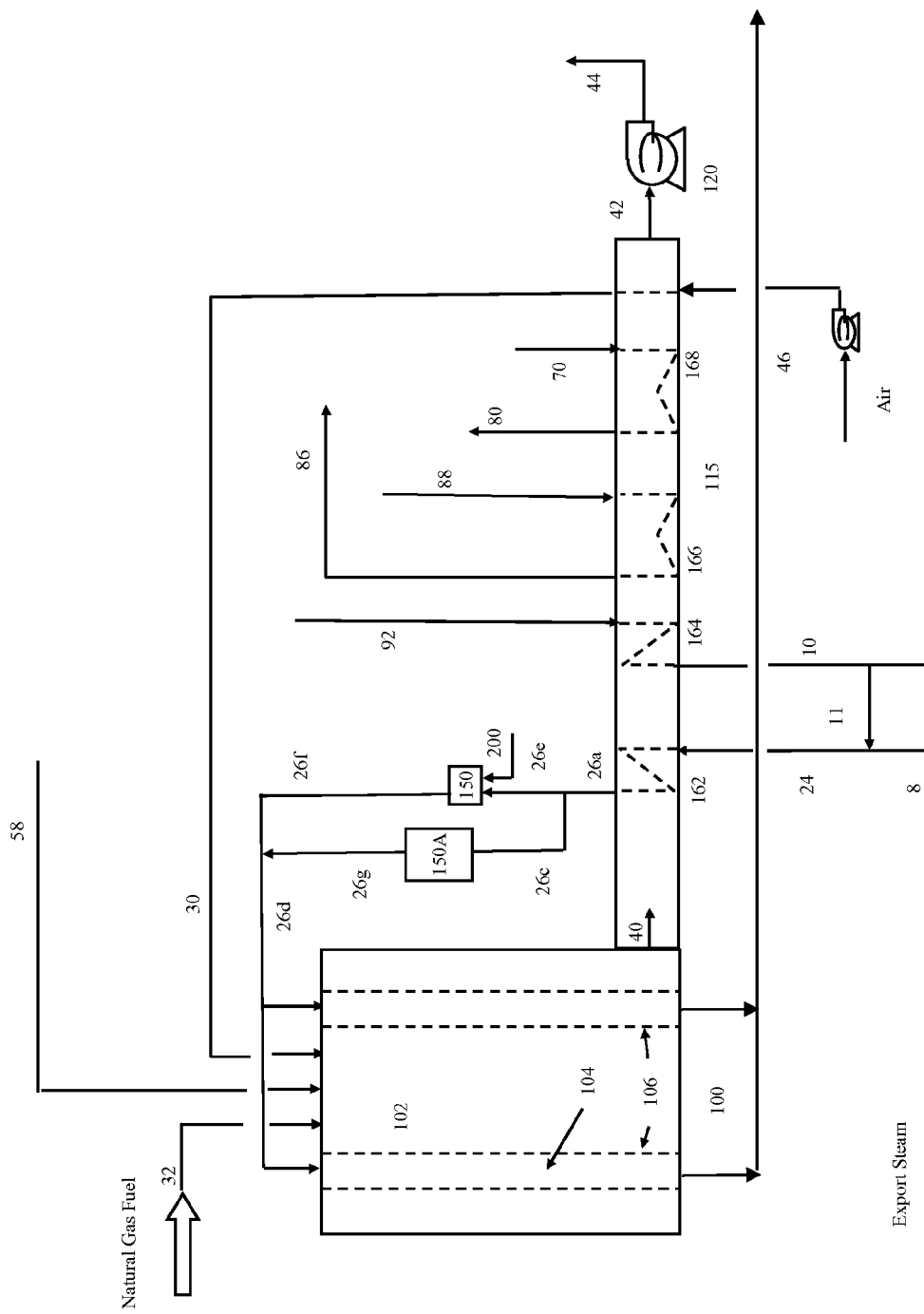
FIG. 6 is a schematic illustrating the dual mode reactor of the present invention integrated with the standard SMR in yet another alternative embodiment of the present invention (with some plant equipment shown in FIG. 1 having been excluded for clarity).

FIG. 6 shows an alternative embodiment of the present invention in which the dual mode reactor is integrated with the standard SMR such that the reactor 150 bypass stream 26c is processed through reactor 150A, which is either a conventional adiabatic pre-reformer or a dual mode reactor operating without oxygen addition in reforming mode only. Hydrocarbon steam reforming and water gas shift reactions occur within reactor 150A, producing hydrogen, carbon monoxide and carbon dioxide. Due to these net endothermic reactions, reactor 150A effluent 26g emerges at a lower temperature than stream 26c with little or no remaining ethane and heavier hydrocarbons. Reactor 150A effluent 26g also emerges at a lower temperature than reactor 150 effluent 26f. As such, reactor 150 effluent 26f is quenched by reactor 150A effluent 26g, yielding a stream 26d which is fed to SMR 100. As previously described, reactor effluent 26f could be additionally quenched by adding a portion of boiler feed water (e.g. stream 80), steam (e.g. stream 86), superheated steam (i.e. 11), preheated hydrocarbon feedstock (i.e. 8) and/or mixed feed (i.e. stream 24). The resulting temperature of stream 26d may be dictated by piping metallurgy and/or by carbon formation concerns.

On the one hand, some advantages of the embodiment shown in FIG. 6 relative to the embodiment shown in FIG. 3 could include: (i) greater reduction of total ethane and heavier hydrocarbons in stream 26d and (ii) more effective use of stream 26g as a quench for reactor 150 effluent 26f due to its lower temperature than stream 26c. On the other hand, a disadvantage of the embodiment shown in FIG. 6 relative to the embodiment shown in FIG. 3 could include greater capital cost associated with the reactor 150A and its associated catalyst.

While the above figures have described the use of high space velocity, dual mode catalytic reactors in a SMR-based hydrogen plant 600, other SMR-based syngas production plants can be envisioned. For example and while not be construed as limiting, the produced syngas can be further processed within the plant to yield various end products, including purified hydrogen, carbon monoxide, methanol and/or ammonia.

Although the invention has been described in detail with reference to certain preferred embodiments, those skilled in the art will recognize that there are other embodiments within the spirit and the scope of the claims.

What is claimed is:
1. A steam methane reforming method, the method comprising:
   introducing a first portion of a feedstock stream comprising steam and desulfurized hydrocarbons into a high space velocity catalytic reactor configured for dual mode operation, one of the dual modes of operation being operation without oxygen addition in a reforming mode and another of the dual modes of operation being operation with oxygen addition in a partial oxidation-reforming mode, wherein the high space velocity catalytic reactor is disposed downstream of a mixed feed preheater operating at a temperature range of about 900 to 1200° F., and a second portion of said feedstock stream bypass said high space velocity catalytic reactor prior to introducing the second portion of the feedstock into a steam methane reforming unit;

reacting the first portion of said feedstock in the high space velocity catalytic reactor such that a pre-reformed gas is produced in the high space velocity catalytic reactor, the pre-reformed gas comprising reduced amounts of heavier hydrocarbons relative to the feedstock;

withdrawing the pre-reformed gas from the high space velocity catalytic reactor;

introducing the pre-reformed gas directly into said steam methane reforming unit; and reacting the pre-reformed gas in the steam methane reforming unit to produce a syngas.

2. The method of claim 1, wherein high space velocity catalytic reactor contains a catalyst supported on a metallic monolith therein.

3. The method of claim 2, wherein the metallic monolith is coated with a catalytic layer comprising one or more Group VIII metals.

4. The method of claim 3, wherein the Group VIII catalyst comprises platinum, rhodium, palladium, nickel, ruthenium or mixtures thereof.

5. The method of claim 2, wherein the monolith is reticulated foam, honeycomb or a corrugated foil wound in a spiral configuration.

6. The method of claim 1, wherein the syngas is further processed to produce a purified hydrogen stream.

7. The method of claim 6, wherein the amount of syngas produced is adjustable based on adjusting the amount of oxygen addition into the high space velocity, dual mode catalytic reactor during the partial oxidation-reforming mode.

8. The method of claim 1, wherein the high space velocity of the high space velocity, dual mode catalytic reactor is greater than 30,000/hr.

9. The method of claim 1, wherein the pre-reformed gas is not subjected to heating after withdrawing the pre-reformed gas from the high space velocity, dual mode catalytic reactor and prior to introduction into the SMR unit.

10. The method of claim 1, wherein a temperature of the pre-reformed gas being withdrawn from the high space velocity, dual mode catalytic reactor during operation in the partial oxidation-reforming mode is equal to or greater than a temperature of the feedstock being introduced into the high space velocity, dual mode catalytic reactor.

11. The method of claim 10, wherein the temperature of the pre-reformed gas being withdrawn from the high space velocity, dual mode catalytic reactor is less than about 1800° F.

12. The method of claim 1, wherein the amount of syngas produced is adjustable based on adjusting the amount of oxygen addition into the high space velocity, dual mode catalytic reactor during the partial oxidation-reforming mode.

13. The method of claim 1, wherein the amount of syngas produced is adjustable based on adjusting the amount of feedstock that is bypassed around the high space velocity, dual mode catalytic reactor.

14. The method of claim 13, wherein the amount of syngas produced is further adjustable based on the amount of oxygen addition into the high space velocity, dual mode catalytic reactor during the partial oxidation-reforming mode.

15. The method of claim 1, wherein the pre-reformed gas withdrawn from the high space velocity catalytic reactor is optionally combined with a portion of the feedstock stream and introduced into the steam methane reformer.

* * * * *